US006730204B2

(12) United States Patent
Mariella, Jr.

(10) Patent No.: US 6,730,204 B2
(45) Date of Patent: May 4, 2004

(54) THREE DIMENSIONAL SEPARATION TRAP BASED ON DIELECTROPHORESIS AND USE THEREOF

(75) Inventor: Raymond P. Mariella, Jr., Danville, CA (US)

(73) Assignee: The Regents of the University of California, Oakland, CA (US)

( * ) Notice: Subject to any disclaimer, the term of this patent is extended or adjusted under 35 U.S.C. 154(b) by 402 days.

(21) Appl. No.: 09/819,110

(22) Filed: Mar. 27, 2001

(65) Prior Publication Data

US 2002/0139675 A1 Oct. 3, 2002

(51) Int. Cl.[7] .................... G01N 27/447; G01N 27/453
(52) U.S. Cl. ....................................... 204/547; 204/643
(58) Field of Search ................................. 204/547, 643

(56) References Cited

U.S. PATENT DOCUMENTS 4,326,934 A * 4/1982 Pohl ........................... 204/547
5,593,565 A * 1/1997 Ajdari et al. ............... 204/643
5,814,200 A 9/1998 Pethig et al. ............... 204/547
5,858,192 A 1/1999 Becker et al. .............. 204/547
5,993,630 A 11/1999 Becker et al. .............. 204/547

OTHER PUBLICATIONS

Gorre–Talini et al. ("Dielectrophoretic ratchets," Chaos (1998), 8(3) 650–656)., Sep. 1998.*

* cited by examiner

*Primary Examiner*—Alex Noguerola
(74) *Attorney, Agent, or Firm*—Eddie E. Scott; Alan H. Thompson

(57) ABSTRACT

An apparatus is adapted to separate target materials from other materials in a flow containing the target materials and other materials. A dielectrophoretic trap is adapted to receive the target materials and the other materials. At least one electrode system is provided in the trap. The electrode system has a three-dimensional configuration. The electrode system includes a first electrode and a second electrode that are shaped and positioned relative to each such that application of an electrical voltage to the first electrode and the second electrode creates a dielectrophoretic force and said dielectrophoretic force does not reach zero between the first electrode and the second electrode.

17 Claims, 4 Drawing Sheets

THREE DIMENSIONAL SEPARATION TRAP BASED ON DIELECTROPHORESIS AND USE THEREOF

CROSS-REFERENCE TO RELATED APPLICATIONS

Some subject matter is disclosed and claimed in the following commonly owned, co-pending, U.S. patent application, "MULTI-STAGE SEPARATIONS BASED ON DIELECTROPHORESIS," by Raymond P. Mariella, Jr., patent application Ser. No. 09/819,108, filed Mar. 27, 2001, which is hereby incorporated by reference in its entirety.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of Endeavor

The present invention relates to separator methods and apparatus and more particularly to dielectrophoretic separator methods and apparatus.

2. State of Technology

U.S. Pat. No. 5,814,200 for an apparatus for separating by dielectrophoresis by Pethig et al, patented Sep. 29, 1998, provides the following description: "The invention relates to a separator, which is particularly useful for separating cellular matter. The separator utilizes the phenomenon known as dielectrophoresis (DEP). A DEP force effects a particle suspended in a medium. The particle experiences a force in an alternating electric field. The force is proportional to, amongst other things, the electrical properties of the supporting medium and the particle and the frequency of the electric field. The separator, of the present invention, comprises a chamber (10) and a plurality of electrodes (12) disposed in the chamber (10). An electric field established across electrodes subjects some of the particles to a stronger force than others such that they are confined within the chamber. Particles which are not confined are removed from the chamber by the supporting medium which is preferably urged through the chamber. Valves (101 and 202) are provided on exhausts of the chamber. The invention is able to separate two different particles continuously."

U.S. Pat. No. 5,993,630 for a method and apparatus for fractionation using conventional dielectrophoresis and field flow fractionation, by Becker et al, patented Nov. 30, 1999, provides the following description: "The present disclosure is directed to a novel apparatus and novel methods for the separation, characterization, and manipulation of matter. In particular, the invention combines the use of frequency-dependent dielectric and conductive properties of particulate matter and solubilized matter with the properties of the suspending and transporting medium to discriminate and separate such matter. The apparatus includes a chamber having at least one electrode element and at least one inlet and one output port into which cells are introduced and removed from the chamber. Matter carried through the chamber in a fluid stream is then displaced within the fluid by a dielectrophoretic (DEP) force caused by the energized electrode. Following displacement within the fluid, matter travels through the chamber at velocities according to the velocity profile of the chamber. After the matter has transited through the chamber, it exits at the opposite end of the chamber at a characteristic position. Methods according to the invention involve using the apparatus for discriminating and separating matter for research, diagnosis of a condition, and therapeutic purposes. Examples of such methods may include separation of mixtures of cells, such as cancer cells from normal cells, separation of parasitized erythrocytes from normal erythrocytes, separation of nucleic acids, and others."

U.S. Pat. No. 5,858,192 for a method and apparatus for manipulation using spiral electrodes, by Becker et al, patented Jan. 12, 1999, provides the following description: "the present disclosure is directed to a novel apparatus and novel methods for the separation, characterization, and manipulation of matter. In particular, the invention combines the use of frequency-dependent dielectric and conductive properties of particulate matter and solubilized matter with the properties of a suspending medium to discriminate and separate such matter. The apparatus includes a chamber having at least one spiral electrode element. Matter is separated in the chamber by a dielectrophoretic (DEP) force caused by the energized electrode or electrodes."

SUMMARY OF THE INVENTION

The present invention provides a dielectrophoretic trap adapted to separate target materials from other materials in a flow containing the target materials and other materials. The dielectrophoretic trap is adapted to be placed in series to the flow and/or in parallel to the flow with direct current and/or alternating voltage or combinations of direct current and alternating voltage. An electrode system including a first electrode and a second electrode is provided in the dielectrophoretic trap. When an electrical voltage is applied to the first electrode and the second electrode a dielectrophoretic force is created between the first electrode and the second electrode. The first electrode and the second electrode are shaped and positioned relative to each other so that that the areas where said dielectrophoretic force zeros between said first electrode and said second electrode is a minimum.

Other features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description and by practice of the invention.

BRIEF DESCRIPTION OF THE DRAWINGS

The accompanying drawings, which are incorporated into and form a part of the disclosure, illustrate embodiments of the invention, and, together with the description, serve to explain the principles of the invention.

DETAILED DESCRIPTION OF THE INVENTION

Figure 1:
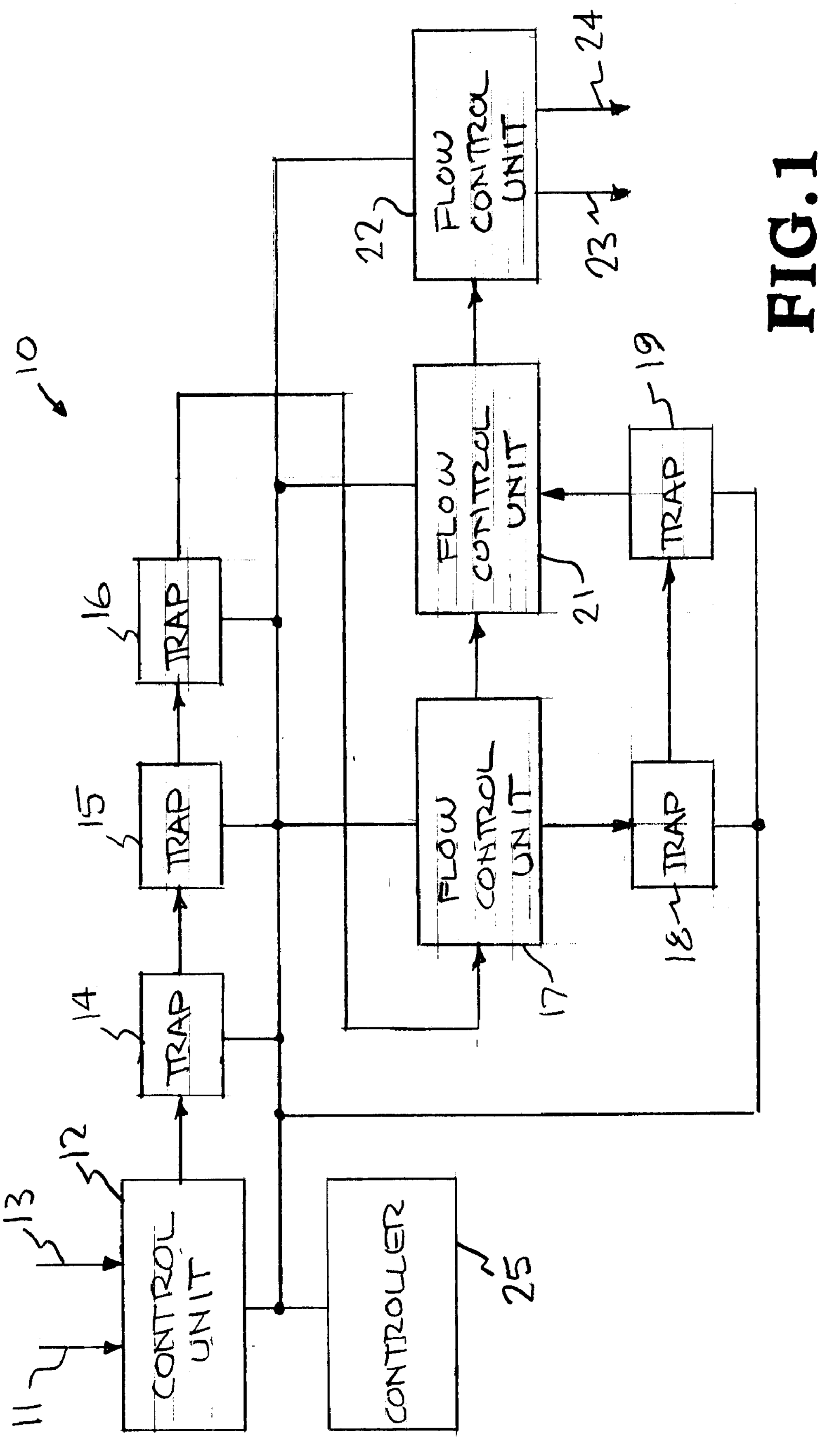
FIG. 1 illustrates an embodiment of the present invention.

Referring now to the drawings, specific embodiments of the invention are shown. The present invention provides a system for particle and molecule separations using fixed direct current electric fields and alternating-current fields. The system uses 3-dimensional electrodes. In one embodiment a hemi-circular (half-coaxial) is used. In other embodiments, quadrupolar configurations are used. The system can be used to manipulate biological or other matter. The matter can be dissolved or suspended in a fluid, such as water. The detailed description of the specific embodiments, together with the general description of the invention, serves to explain the principles of the invention.

Dielectrophoretic separators rely on the phenomenon that substances within a non-uniform DC or AC electric field experience a dielectrophoretic force. The dielectrophoretic force causes the substance, which may be gaseous, liquid, solid, or dissolved in solution, to move within the field. A dielectrophoretic field can have different effects upon different substances. This effect may be used to filter or separate substances, usually solids in suspension, from a liquid for the purposes of analysis.

Referring now to FIG. 1, an embodiment of a system constructed in accordance with the present invention is illustrated. The system, designated generally by the reference numeral 10, provides the collection, separation, and purification of particles and/or molecules from a flowing fluid using dielectrophoresis. Dielectrophoresis has been generally employed for separation of matter, utilizing particle density, size, volume, diffusivity, thickness, and surface charge as parameters. The technique can be used to separate many different types of matter including, for example, biological and non-biological matter. Separation by dielectrophoresis occurs by differential retention in a stream of liquid flowing through a thin channel. The technique generally requires the presence of a field or gradient. The field is applied to the flow and serves to drive the matter into different displacements within the flow profile.

Free ions can be pulled out of solution or, at least, can be deflected away from the rest of the flow stream by using a direct current bias. The molecules or particles with larger dielectric polarizabilities can be drawn away from the center of the flow stream by applying an independent alternating current. By arranging the electrodes in parallel with the direction of flow, the dielectrophoretic separation is improved. This allows the use of greater volumetric flow; larger cross-sectional areas or just higher speed transport of the bulk fluid through the trap. This has the disadvantage of spreading out the desired trapped molecules or particles ("target") over a larger surface area than could be achieved via a trap with transverse electrodes.

The system 10 answers this problem by using both styles of traps, separated in space and time. The system 10 utilizes multi-stage traps based on dielectrophoresis to trap, concentrate, separate, and/or purify desired particles. The system 10 utilizes traps in series to the flow and in parallel to the flow with combinations of direct current and alternating voltage. The system 10 can be used to manipulate biological or other matter including biological cells, molecules, and DNA.

A stream 13 containing target particles or molecules enters the flow control unit 12. Also entering the flow control unit 12 is a stream 11 of fresh wash or wash with reagents. The stream leaving flow control unit 12 is directed through traps 14, 15, and 16. The stream leaving trap 16 is directed to flow control unit 17. Flow control unit 17 can divert the stream through traps 18 and 19. After leaving traps 18 and 19 the stream travels through flow control unit 21 to flow control unit 22. The waste steam 24 leaves the system through flow control unit 22. The target particles leave flow control unit 22 through stream 23 and are directed to assays. A controller 25 monitors and actuates flow control units 12, 17, 21, and 22. Controller 25 also monitors, actuates, and adjusts traps 14, 15, 16, 18, and 18.

The dielectrophoretic traps 14, 15, 16, 18, and 18 are adapted to be placed in series to the flow and in parallel to the flow with combinations of direct current and alternating voltage. The system uses 3-dimensional electrodes. In one embodiment a hemi-circular (half-coaxial) is used. In other embodiments, quadrupolar configurations are used. It is to be understood that various combinations of dielectrophoretic traps 14, 15, 16, 18, and 18 placed in series to the flow and in parallel to the flow with combinations of direct current and alternating voltage can be utilized. An example will be described in reference to FIG. 1. Traps 14, 15, and 16 are based on dielectrophoresis with the electrodes parallel to the flow direction. Traps 14, 15, and 16 can be used with direct current or alternating voltage. Traps 18 and 19 are traps based on dielectrophoresis with the electrodes transverse to the flow direction. Traps 18 and 19 can be used with direct current or alternating voltage. Examples of DiEP traps with electrodes parallel to the flow direction and DiEP traps with electrodes transverse to the flow direction are shown in commonly owned, co-pending, U.S. patent application, "MULTI-STAGE SEPARATIONS BASED ON DIELECTROPHORESIS," by Raymond P. Mariella, Jr., patent application Ser. No. 09/819,108, filed Mar. 27, 2001, which is hereby incorporated by reference in its entirety.

The structural elements of the system 10 having now been identified, the operation of the system 10 will now be described. By arranging multiple DiEP traps 14, 15, and 16 in series, each operating at a different AC frequency that is particularly effective at trapping one target particle or molecule, it is possible to produce a DiEP "filter" that traps multiple species at different spatial locations. The first trap 14, operating at 30 Hz, traps particles, such as DNA, responding to the lowest frequency AC fields; the second trap 15 operates at 30 Khz and traps vegetative bacteria; the third trap 16 operates at 30 Mhz and traps spores. Each trap has a different length. Some targets are easier to trap than others.

Once the multiple targets are trapped, each one is released individually or with others under slower flow conditions to be concentrated at the transverse-electrode trap. So long as a trap works both with the original fluid and a second fluid, which might be cleaner or might contain reagents, or both, then the trapped target can be transported into a sample preparation region that included reagents, sonication, temperature control, light, etc.

The fluidic system incorporates a microfluidic side loop into which the concentrated sample could be released for sample preparation, such as spore lysis, after which the prepared sample could be passed over to traps 18 and 19 to separate DNA from the debris that results from the spore preparation. Similarly, RNA viruses can be treated with reverse transcriptase, which produces the virus' DNA signature. In both of these latter two examples, the DNA that resulted from the sample preparation procedures can be trapped and, thereby, cleaned up with a low-frequency DiEP trap for later re-release and analysis.

The system 10 is started by operating with higher volumetric flow rate, and trap the target over the large surface-area parallel-electrode traps 14, 15, and 16. During this step, the overall efficiency of trapping of target is maximized. After operating the first traps 14, 15, and 16 for a period of time, the flow rate is reduced and the target is released from the parallel-electrode traps 14, 15, and 16 back into the fluid, to be trapped by the smaller transverse-electrode traps 18 and 19. If the flow rate has been sufficiently reduced, then the second traps 18 and 19 can efficiently re-capture the target, but this time it will be trapped onto a small surface area. Thus, the target will have been removed efficiently from the original fluid and will have been concentrated to a much greater extent than through the use of only the first traps.

Once this has been accomplished, the target can be re-released into a much smaller volume of fluid. In this manner, the desired target can be isolated and concentrated into a desired fluid. It can be re-released into different fluids than that which originally contained the target, so long as the traps continued to retain the target during the switchover of fluids. This allows the introduction of a cleaner carrier fluid for performing sample preparation or assays, or the fluid could contain reagents that might preserve, denature, or activate the target for later use.

It is desirable to extract as large a fraction of the targets from the fluid as is possible. The electrodes are utilized so that the dielectrophoretic force can be made more uniform across the entire flow channel. Flat electrodes on a single surface exert a highly non-uniform force, with the maximum effect very near the flow channel's surface. This means that the targets that are physically distant from the strong-force region are only weakly attracted and, therefore, may not be trapped.

Figure 2:
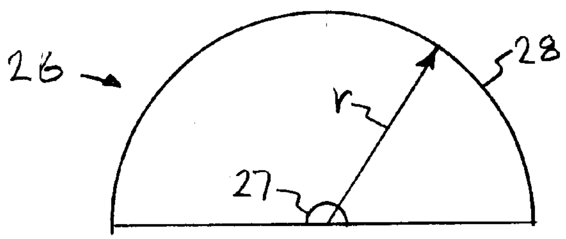
FIG. 2 illustrates a half-coaxial electrode configuration.

Referring now to FIG. 2 an embodiment of a trap with an electrode configuration constructed in accordance with the present invention is illustrated. The trap, generally designated by the reference numeral 26, is used to pull the desired targets out of a moving solution, and then, with reduced flow rate, release the targets from this trap and collect the targets. The trap 26 can be used, for example, in place of the trap 14 shown in FIG. 1 with the electrodes parallel to the flow direction. Trap 26 can be used with direct current or alternating voltage. The trap 26 can also be used for example, in place of the trap 18 shown in FIG. 1 with the electrodes transverse to the direction of flow and trap 26 can be used with direct current or alternating voltage. The electrodes 27 and 28 are 3-dimensional electrodes. As shown by FIG. 2, the electrodes 27 and 28 are hemi-circular (half-coaxial) in configuration.

As shown in FIG. 2, the field varies as r, where r is the distance from the smaller electrode 28 to the larger electrode 27. The dielectric force, therefore, varies as $r^3$. This configuration has the advantage that there are no short distances between electrodes, which may be useful in avoiding the electrolysis of water, for example. In addition, there is no location in which the dielectrophoretic force is zero—the entire cross-sectional area is swept out. It should be noted however that this has the disadvantage of exerting its maximum force only very close to the smaller electrode 28. The trap 28 can, for example, be used as the over the large surface-area parallel-electrode traps 14, 15, and 16 shown in FIG. 1.

Figure 3:
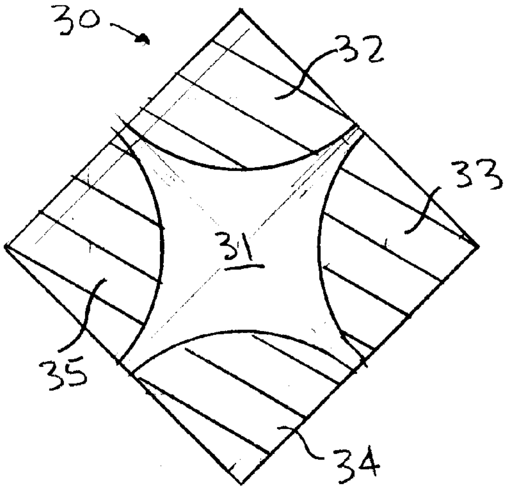
FIG. 3 illustrates a dielectrophoretic trap with electrodes in the longitudinal-configuration.

Referring now to FIG. 3, an embodiment of a trap with the electrode configuration constructed in accordance with the present invention is illustrated. The trap, generally designated by the reference numeral 30, is used to pull the desired targets out of a moving solution, and then, with reduced flow rate, release the targets from this trap and collect the targets. The trap 30 can be used for example, in place of the trap 14 shown in FIG. 1 with the electrodes parallel to the direction of the flow channel 31. Trap 30 can be used with direct current or alternating voltage. The electrodes 32, 33, 34, and 35 are 3-dimensional electrodes. As shown by FIG. 3, the trap 30 is a quadrupole trap with electrodes 32, 33, 34, and 35 having hyberbolic surfaces.

In an ideal quadrupole, with symmetrical hyperbolic surfaces, as shown in FIG. 3, the field varies linearly from the center to the edges. The force (the derivative of the energy with respect to position) due to dielectrophoresis, F, varies as the (vector) d/dr (p*E), where E is the electric field and p is the induced dipole. p is equal to the (vector multiplication) product of the polarizability, $\alpha$, times E. Thus, assuming that $\alpha$ is not a function of E, then the F is proportional to $\alpha E$, where E varies linearly with radial position, r. Thus, F varies linearly over the entire flow channel 31. Unfortunately, the force is zero at the exact center, since that is where the field is zero. If the target particles and molecules are present in a fluid that is moving under laminar-flow conditions, it may be that some targets would physically stay on a streamline that passed through the zero-field point of the quarupole's trap, thus escaping. This is particularly a concern, since the maximum flow speed is along the point of zero force. The exact shape and/or location of the electrode surfaces of electrodes 32, 33, 34, and 35 are varied along the length of the trap 30. This moves the location of zero dielectrophoretic force.

So long as the flow streamline did not also follow in the same path, then all targets experience some dielectrophoretic force for trapping as they flow through the trap. Simply by displacing one electrode away from its point of symmetry, the location of the zero-force point is also be displaced away from the point of maximum flow speed.

Moreover, the field is most intense near the extreme edges of the quadrupole, where, in a longitudinal-electrode configuration (electrodes parallel to the fluid-flow direction), the volumetric flow velocity is the least, in the longitudinal-electrode configuration. This configuration also has the disadvantage that there are short distances between electrodes, which may limit the maximum applied voltage due to the electrolysis of water, for example. Therefore, there is some advantage to using modified-(nonhyperbolic-) shape electrodes and non-symmetrical configurations. In a perfectly-symmetrical, hyperbolic-electrode quadrupole, the target particles or molecules would be forced into the narrow space between the electrodes, since this is where the field is the field is the most intense and their energy is the lowest. This is also where the fluid flow is the slowest, so that it would serve best as a region for storing the trapped targets.

The trap 30 can also be used for example, in place of the trap 18 shown in FIG. 1 with the electrodes transverse to the direction of flow. Trap 30 can be used with direct current or alternating voltage. If we attempt to use such shaped electrodes in a configuration that is transverse to the flow, we may need to break the 4-way symmetry of the design to accommodate the fluid flow. The trap 30 is adapted to separate target materials from other materials in the flow channel. A dielectrophoretic force is created by applying an electrical voltage to a first electrode and a second electrode in the trap. The first electrode and the second electrode are shaped and positioned relative to each other so that that any areas where the dielectrophoretic force is zero between the first electrode and the second electrode is a minimum.

Figure 4:
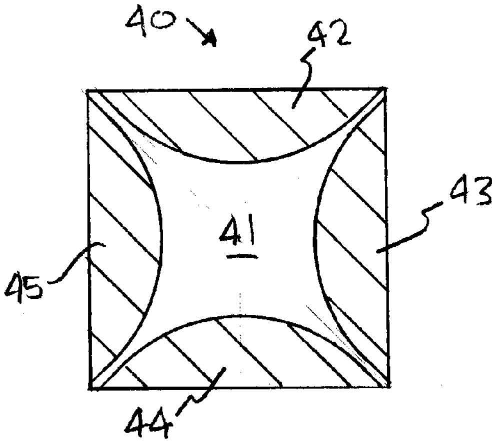
FIG. 4 illustrates a quadrupole trap with hyberbolic surfaces.

Referring now to FIG. 4, an embodiment of a trap with the electrode configuration constructed in accordance with the present invention is illustrated. The trap, generally designated by the reference numeral 40, is used to pull the desired targets out of a moving solution, and then, with reduced flow rate, release the targets from this trap and collect the targets. The trap 40 can be used for example, in place of the trap 14 shown in FIG. 1 with the electrodes parallel to the direction of the flow channel 41. Trap 40 can be used with direct current or alternating voltage. The electrodes 42, 43, 44, and 45 are 3-dimensional electrodes. As shown by FIG. 4, the trap 40 is a quadrupole trap with electrodes 42, 43, 44, and 45 having hyberbolic surfaces.

In an ideal quadrupole, with symmetrical hyperbolic surfaces, as shown in FIG. 4, the field varies linearly from the center to the edges. The force (the derivative of the energy with respect to position) due to dielectrophoresis, F, varies as the (vector) d/dr (p*E), where E is the electric field and p is the induced dipole. p is equal to the (vector multiplication) product of the polarizability, $\alpha$, times E. Thus, assuming that $\alpha$ is not a function of E, then the F is proportional to $\alpha$E, where E varies linearly with radial position, r. Thus, F varies linearly over the entire flow channel 41. Unfortunately, the force is zero at the exact center, since that is where the field is zero. If the target particles and molecules are present in a fluid that is moving under laminar-flow conditions, it may be that some targets would physically stay on a streamline that passed through the zero-field point of the quarupole's trap, thus escaping. This is particularly a concern, since the maximum flow speed is along the point of zero force. The exact shape and/or location of the electrode surfaces of electrodes 42, 43, 44, and 45 are varied along the length of the trap 40. This moves the location of zero dielectrophoretic force.

So long as the flow streamline did not also follow in the same path, then all targets experience some dielectrophoretic force for trapping as they flow through the trap. Simply by displacing one electrode away from its point of symmetry, the location of the zero-force point is also be displaced away from the point of maximum flow speed.

Moreover, the field is most intense near the extreme edges of the quadrupole, where, in a longitudinal-electrode configuration (electrodes parallel to the fluid-flow direction), the volumetric flow velocity is the least, in the longitudinal-electrode configuration. This configuration also has the disadvantage that there are short distances between electrodes, which may limit the maximum applied voltage due to the electrolysis of water, for example. Therefore, there is some advantage to using modified-(nonhyperbolic-) shape electrodes and non-symmetrical configurations. In a perfectly-symmetrical, hyperbolic-electrode quadrupole, the target particles or molecules would be forced into the narrow space between the electrodes, since this is where the field is the field is the most intense and their energy is the lowest. This is also where the fluid flow is the slowest, so that it would serve best as a region for storing the trapped targets.

The trap 40 can also be used for example, in place of the trap 18 shown in FIG. 1 with the electrodes transverse to the direction of flow. Trap 40 can be used with direct current or alternating voltage. If we attempt to use such shaped electrodes in a configuration that is transverse to the flow, we may need to break the 4-way symmetry of the design to accommodate the fluid flow.

Figure 5:
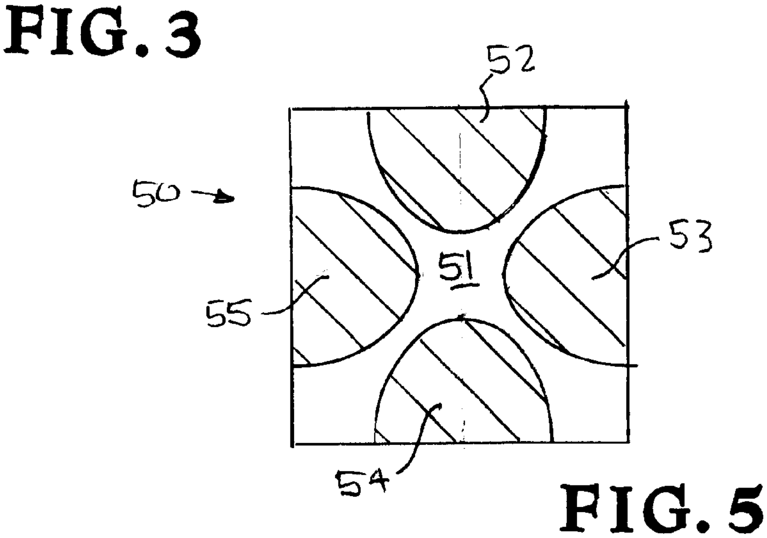
FIG. 5 illustrates a quadrupole trap with modified hyberbolic surfaces.

Referring now to FIG. 5, an embodiment of a trap with the electrode configuration constructed in accordance with the present invention is illustrated. The trap, generally designated by the reference numeral 50, is used to pull the desired targets out of a moving solution, and then, with reduced flow rate, release the targets from this trap and collect the targets. The trap 50 can be used for example, in place of the trap 14 shown in FIG. 1 with the electrodes parallel to the direction of the flow channel 51. Trap 50 can be used with direct current or alternating voltage. The electrodes 52, 53, 54, and 55 are 3-dimensional electrodes. As shown by FIG. 5, the trap 50 is a quadrupole trap with electrodes 52, 53, 54, and 55 having hyberbolic surfaces. The trap 50 is created by arranging the electrode system, electrodes 52, 53, 54, and 55, in a hemi-circular (half-coaxial) configuration. This embodiment would decrease the problems associated with the hydrolysis of water. The four corners experience a gradient of similar magnitude (but in an opposite direction) as is present in the center of the channel 51.

The trap 50 can also be used for example, in place of the trap 18 shown in FIG. 1 with the electrodes transverse to the direction of flow. Trap 50 can be used with direct current or alternating voltage. If we attempt to use such shaped electrodes in a configuration that is transverse to the flow, we may need to break the 4-way symmetry of the design to accommodate the fluid flow. Trap 50 is adapted to separate target materials from other materials in the flow channel using a dielectrophoretic force created by applying an electrical voltage. The trap 50 is adapted to receive the target materials and other materials in the flow channel. An electrode system is provided in the dielectrophoretic trap 50. The electrode system has a first electrode in the flow channel and a second electrode in the flow channel. The first electrode and the second electrode have surfaces. The first electrode and the second electrode are shaped and positioned relative to each other so that the distances between the surfaces constantly varies. Application of the electrical voltage creates a dielectrophoretic force in the flow channel between the first electrode and the second electrode. The first electrode and the second electrode are shaped and positioned relative to each other so that any areas where the dielectrophoretic force is zero between the first electrode and the second electrode is a minimum.

In all three of the quadrupole-electrode configurations shown in FIGS. 3, 4, and 5, there is no deliberate attempt to attract the targets to one point on the surface of any electrode. In another embodiment of the present invention this is accomplished by fabricating a slightly raised area (a bump on the surface) on the surface of an electrode. The advantage of this is that the targets would be pulled out of the flowing fluid and into the stagnant boundary layer that is typically present, absent electroosmotic flow. The disadvantage of forcing target particles or molecules against a surface is that they might adhere and, therefore, not be easy to dislodge for subsequent manipulations and/or assay procedures.

Figure 6:
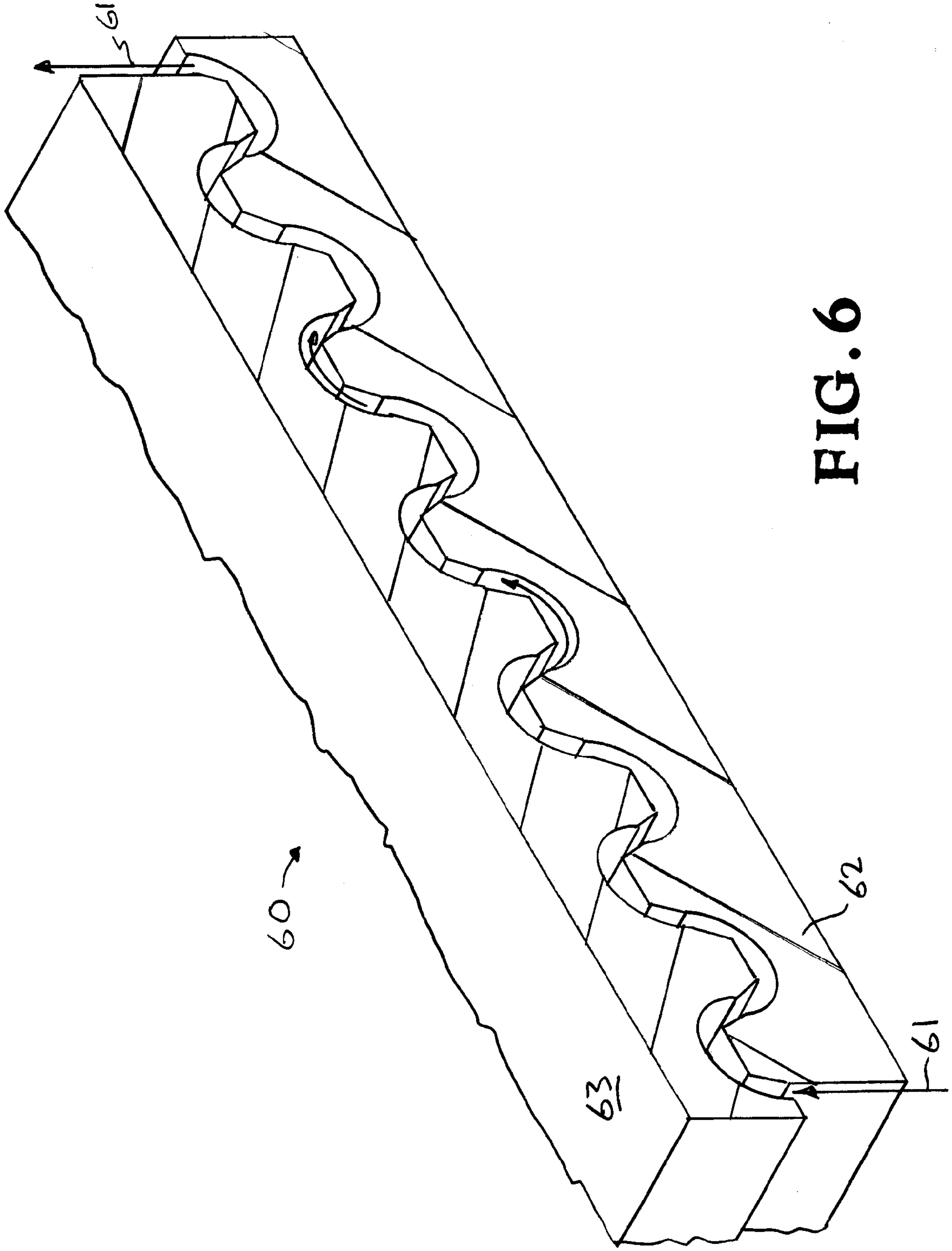
FIG. 6 is section of an electrode illustrating a series of separated 3-D knuckle-shaped electrodes.

Referring now to FIG. 6, another embodiment of a trap with the electrode configuration constructed in accordance with the present invention is illustrated. The trap, generally designated by the reference numeral 60, is used to pull the desired targets out of a moving solution, and then, with reduced flow rate, release the targets from this trap and collect the targets. The trap 60 is a trap with electrodes 62, and 63 having a series of separated 3-D knuckle-shaped electrodes. The trap 60 can be used for example, in place of the trap 14 shown in FIG. 1 with the electrodes parallel to the direction of the flow channel 61. Trap 60 can be used with direct current or alternating voltage. The trap 60 can also be used for example, in place of the trap 18 shown in FIG. 1 with the electrodes transverse to the direction of flow. Trap 60 can be used with direct current or alternating voltage.

The electrodes 62 and 63 are 3-dimensional electrodes. As shown by FIG. 6, the trap 60 is a trap with electrodes 62, and 63 having a series of separated 3-D knuckle-shaped electrodes. The force (the derivative of the energy with respect to position) due to dielectrophoresis, F, varies as the (vector) d/dr (p*E), where E is the electric field and p is the induced dipole. p is equal to the (vector multiplication) product of the polarizability, α, times E. Thus, assuming that α is not a function of E, then the F is proportional to αE, where E varies linearly with radial position, r. Thus, F varies linearly over the entire flow channel 61. This embodiment 63 having a series of separated 3-D knuckle-shaped electrodes 62 and 63 has the advantage that F would not be zero at the point of maximum flow speed of the fluid.

Figure 7:
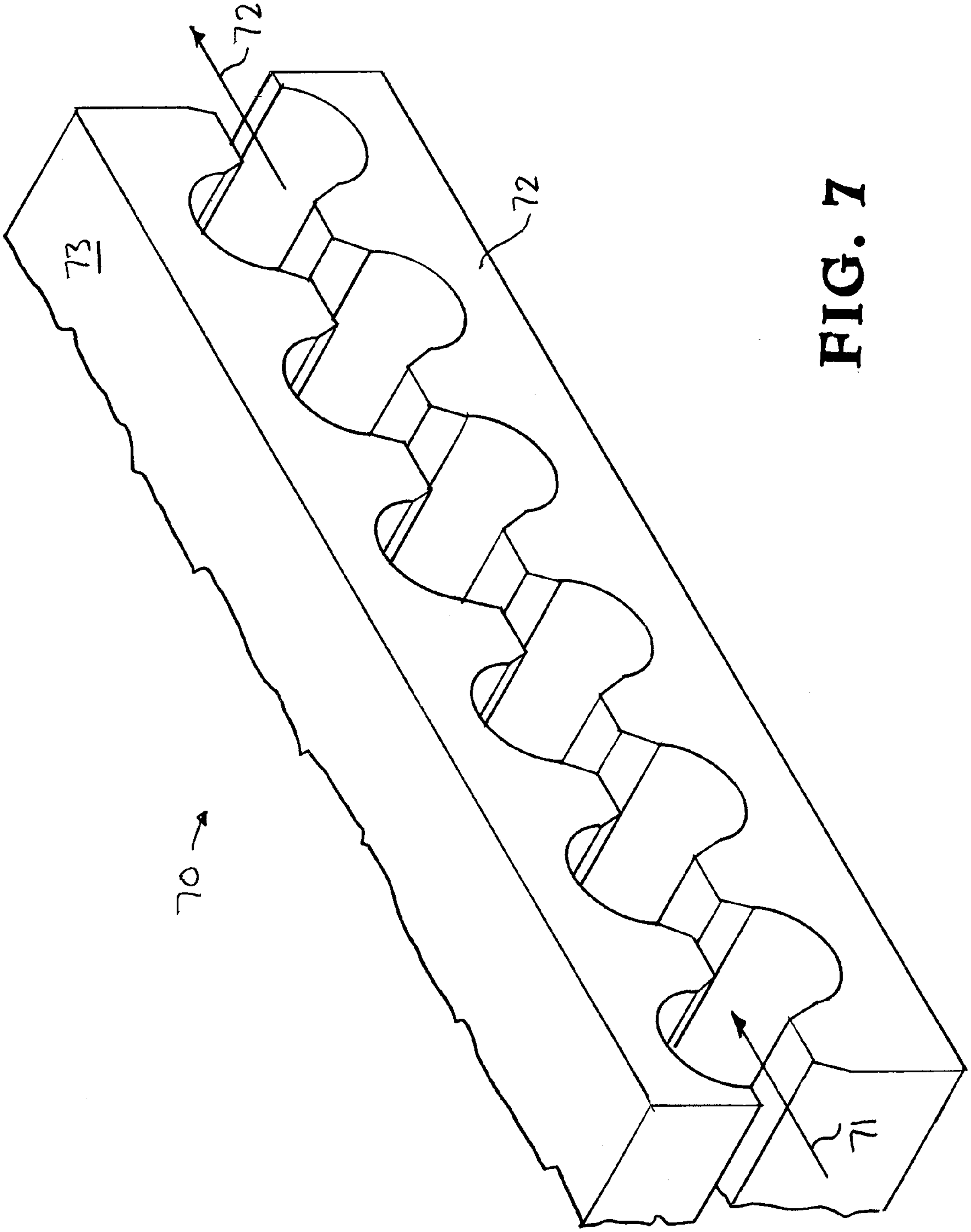
FIG. 7 is section of an electrode illustrating another embodiment of a series of separated 3-D knuckle-shaped electrodes.

An electrode illustrating another embodiment of a trap with the electrode configuration in the form of a series of separated 3-D knuckle-shaped electrodes is shown in FIG. 7. The trap, generally designated by the reference numeral 70, is used to pull the desired targets out of a moving solution, and then, with reduced flow rate, release the targets from this trap and collect the targets. The trap 70 is a trap with electrodes 72, and 73 having a series of separated 3-D knuckle-shaped electrodes. The trap 70 can be used for example, in place of the trap 14 shown in FIG. 1 with the electrodes parallel to the direction of the flow channel 71. Trap 70 can be used with direct current or alternating voltage. The trap 70 can also be used for example, in place of the trap 18 shown in FIG. 1 with the electrodes transverse to the direction of flow. Trap 70 can be used with direct current or alternating voltage.

The electrodes 72 and 73 are 3-dimensional electrodes. As shown by FIG. 7, the trap 70 is a trap with electrodes 72, and 73 having a series of separated 3-D knuckle-shaped electrodes. The force (the derivative of the energy with respect to position) due to dielectrophoresis, F, varies as the (vector) d/dr (p*E), where E is the electric field and p is the induced dipole. p is equal to the (vector multiplication) product of the polarizability, α, times E. Thus, assuming that α is not a function of E, then the F is proportional to αE, where E varies linearly with radial position, r. Thus, F varies linearly over the entire flow channel 71. This embodiment 63 having a series of separated 3-D knuckle-shaped electrodes 72 and 73 has the advantage that F would not be zero at the point of maximum flow speed of the fluid.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. An apparatus adapted to separate target materials from other materials in a flow channel using a dielectrophoretic force created by applying an electrical voltage, comprising:

a dielectrophoretic trap adapted to receive said target materials and said other materials in said flow channel, an electrode system in said dielectrophoretic trap, said electrode system having a first electrode in said flow channel, a second electrode in said flow channel, a third electrode in said flow channel, and a fourth electrode in said flow channel, wherein said first electrode and said second electrode have surfaces and wherein said first electrode, said second electrode, said third electrode, and said fourth electrode, are shaped and positioned relative to each other so that the distances between said surfaces constantly varies and wherein said electrode system has a quadrupolar configuration.

2. An apparatus adapted to separate target materials from other materials in a flow channel using a dielectrophoretic force created by applying an electrical voltage, comprising:

a dielectrophoretic trap adapted to receive said target materials and said other materials in said flow channel, an electrode system in said dielectrophoretic trap, said electrode system having a first electrode in said flow channel, and a second electrode in said flow channel, wherein said first electrode and said second electrode have surfaces and wherein said first electrode and said second electrode are shaped and positioned relative to each other so that the distances between said surfaces constantly varies and wherein said first electrode has a hyberbolic surface.

3. The apparatus of claim 2 wherein said second electrode has a hyberbolic surface.

4. The apparatus of claim 2 wherein said first electrode has a symmetrical hyberbolic surface.

5. The apparatus of claim 2 wherein said second electrode has a symmetrical hyberbolic surface.

6. The apparatus of claim 2 wherein said first electrode has a symmetrical hyberbolic surface and said second electrode has a symmetrical hyberbolic surface.

7. An apparatus adapted to separate target materials from other materials in a flow channel using a dielectrophoretic force created by applying an electrical voltage, comprising:

a dielectrophoretic trap adapted to receive said target materials and said other materials in said flow channel, an electrode system in said dielectrophoretic trap, said electrode system having a first electrode in said flow channel, and a second electrode in said flow channel, wherein said first electrode and said second electrode have surfaces and wherein said first electrode and said second electrode are shaped and positioned relative to each other so that the distances between said surfaces constantly varies and wherein said first electrode has a non-symmetrical hyberbolic surface.

8. The apparatus of claim 7 wherein said second electrode has a non-symmetrical hyberbolic surface.

9. An apparatus adapted to separate target materials from other materials in a flow channel using a dielectrophoretic force created by applying an electrical voltage, comprising:

a dielectrophoretic trap adapted to receive said target materials and said other materials in said flow channel, an electrode system in said dielectrophoretic trap, said electrode system having a first electrode in said flow channel, and a second electrode in said flow channel, wherein said first electrode and said second electrode have surfaces and wherein said first electrode and said second electrode are shaped and positioned relative to each other so that the distances between said surfaces constantly varies and wherein said electrode system has a series of separated 3-D knuckle-shaped electrodes.

10. A method of separating target materials from other materials in a flow channel by creating a dielectrophoretic force in said flow channel, comprising the steps of:

arranging an electrode system in said flow channel, said electrode system having a first electrode, a second electrode, a third electrode, and a fourth electrode each having a three-dimensional configuration with said first electrode, said second electrode, said third electrode, and said fourth electrode being shaped and positioned relative to each other so that that any areas where said dielectrophoretic force is zero between said first electrode and said second electrode is a minimum, arranging said electrode system in a quadrupolar configuration, flowing said target materials and said other materials through said flow channel, energizing said electrode system by applying an electrical voltage to said first electrode and said second electrode to create said dielectrophoretic force in said flow channel between said first electrode and said second electrode to separate said target materials from said other materials.

11. A method of separating target materials from other materials in a flow channel by creating a dielectrophoretic force in said flow channel, comprising the steps of:

arranging an electrode system in said flow channel, said electrode system having a first electrode and a second electrode each having a three-dimensional configuration with said first electrode and said second electrode being shaped and positioned relative to each other so that that any areas where said dielectrophoretic force is zero between said first electrode and said second electrode is a minimum, positioning and shaping said electrode system to include a first electrode with a hyberbolic surface, flowing said target materials and said other materials through said flow channel, energizing said electrode system by applying an electrical voltage to said first electrode and said second electrode to create said dielectrophoretic force in said flow channel between said first electrode and said second electrode to separate said target materials from said other materials.

12. The method of claim 11 including the step of positioning and shaping said electrode system to include a second electrode with a hyberbolic surface.

13. A method of separating target materials from other materials in a flow channel by creating a dielectrophoretic force in said flow channel, comprising the steps of:

arranging an electrode system in said flow channel, said electrode system having a first electrode and a second electrode each having a three-dimensional configuration with said first electrode and said second electrode being shaped and positioned relative to each other so that that any areas where said dielectrophoretic force is zero between said first electrode and said second electrode is a minimum, positioning and shaping said electrode system to include a first electrode with a symmetrical hyberbolic surface, flowing said target materials and said other materials through said flow channel, energizing said electrode system by applying an electrical voltage to said first electrode and said second electrode to create said dielectrophoretic force in said flow channel between said first electrode and said second electrode to separate said target materials from said other materials.

14. The method of claim 13 including the step of positioning and shaping said electrode system to include a second electrode with a symmetrical hyberbolic surface.

15. A method of separating target materials from other materials in a flow channel by creating a dielectrophoretic force in said flow channel, comprising the steps of:

arranging an electrode system in said flow channel, said electrode system having a first electrode and a second electrode each having a three-dimensional configuration with said first electrode and said second electrode being shaped and positioned relative to each other so that that any areas where said dielectrophoretic force is zero between said first electrode and said second electrode is a minimum, positioning and shaping said electrode system to include a first electrode with a non-symmetrical hyberbolic surface, flowing said target materials and said other materials through said flow channel, energizing said electrode system by applying an electrical voltage to said first electrode and said second electrode to create said dielectrophoretic force in said flow channel between said first electrode and said second electrode to separate said target materials from said other materials.

16. The method of claim 15 including the step of positioning and shaping said electrode system to include a second electrode with a non-symmetrical hyberbolic surface.

17. A method of separating target materials from other materials in a flow channel by creating a dielectrophoretic force in said flow channel, comprising the steps of:

arranging an electrode system in said flow channel, said electrode system having a first electrode and a second electrode each having a three-dimensional configuration with said first electrode and said second electrode being shaped and positioned relative to each other so that that any areas where said dielectrophoretic force is zero between said first electrode and said second electrode is a minimum, arranging said electrode system in a separated 3-D knuckle-shaped electrode configuration, flowing said target materials and said other materials through said flow channel, energizing said electrode system by applying an electrical voltage to said first electrode and said second electrode to create said dielectrophoretic force in said flow channel between said first electrode and said second electrode to separate said target materials from said other materials.

* * * * *